United States Patent [19]

Janian

[11] Patent Number: 5,732,441
[45] Date of Patent: Mar. 31, 1998

[54] LOW FRICTION WHEEL

[76] Inventor: Robert Janian, 3845 Ballina Cyn. Rd., Encino, Calif. 91436

[21] Appl. No.: 743,055

[22] Filed: Nov. 4, 1996

Related U.S. Application Data

[63] Continuation of Ser. No. 580,897, Dec. 29, 1995, abandoned, which is a continuation of Ser. No. 222,900, Apr. 6, 1994, abandoned.

[51] Int. Cl.$^6$ .................. A47B 91/00; B60B 33/00
[52] U.S. Cl. .................. 16/45; 384/276; 384/416
[58] Field of Search .................. 16/45, 46, 47, 16/25, 36; 384/58.59, 276, 295, 300, 416, 418, 900; 301/5.1, 57, 105.1; 152/323

[56] References Cited

U.S. PATENT DOCUMENTS

| | | | |
|---|---|---|---|
| 200,241 | 2/1878 | Atkinson | 384/416 |
| 698,110 | 4/1902 | Foy | 16/45 |
| 3,401,421 | 9/1968 | Aninger | 16/25 |
| 4,285,550 | 8/1981 | Blackburn et al. | 16/25 |
| 4,783,880 | 11/1988 | Chapman et al. | 16/36 |
| 5,056,938 | 10/1991 | Ahlman et al. | 384/276 |
| 5,219,232 | 6/1993 | Adams et al. | 384/418 |

FOREIGN PATENT DOCUMENTS

| | | | |
|---|---|---|---|
| 453503 | 12/1974 | U.S.S.R. | 384/226 |

*Primary Examiner*—Chuck Y. Mah

[57] ABSTRACT

An industrial wheel for trolleys, carts, pulleys. And the like with a self lubricated bearing of fuoroplastic, or the like, that slants at an angle from the center of the wheel out to the rim, so as to have a larger surface area, with consequent lower force or friction. The slanted bearing also locates the wheel in the center, eliminating the need for retaining devices along sides of the wheel.

1 Claim, 5 Drawing Sheets

LOW FRICTION WHEEL

This application is a continuation of application Ser. No. 08/580,897, filed Dec. 29, 1995, now abandoned, which is a continuation of Ser. No. 08/222,900, Apr. 6, 1994, now abandoned.

FIELD OF INVENTION

This invention pertains to a bearing design for industrial wheels that are used in applications such as trolleys, pulleys, carts and the like.

BACKGROUND OF INVENTION

The prior art recognizes the use of utility type wheels that have bearings made of low friction materials such as fluoroplastics. The bearing may be impregnated with lubricating substances like Molybdenum Disulphite to lower friction. Typically, prior art wheels comprise a hub with cylindrical bearing sleeves, encircling the hub. The wheel would then rotate around the exterior cylindrical surface of the bearing. A retaining device was needed alongside the wheel to prevent it from sliding off the bearing surface.

STATEMENT OF INVENTION

Briefly, this invention contemplates a bearing which, instead of a constant diameter cylinder, has a "V" shape configuration across the width of the wheel. For the purposes of this specification, width is defined as the distance parallel to the axis of rotation which is orthogonal to the diameter. Since the bearing diameter varies with the thickness of the wheel the surface area of the bearing is greater for any given size wheel. Hence, the force in pounds per square inch applied to the bearing surface is reduced which yields less wear and distortion.

Additionally, the bearing diameter may be changed from the center of the wheel from small to large thus forming a "V" within which the wheel is trapped. This eliminates the need for retaining devices thus reducing additional parts and friction even further and making the wheel less expensive to manufacture. Other advantages and benefits will become apparent from following detailed description and the drawing.

DETAILED DESCRIPTION OF THE INVENTION

Figure 1:
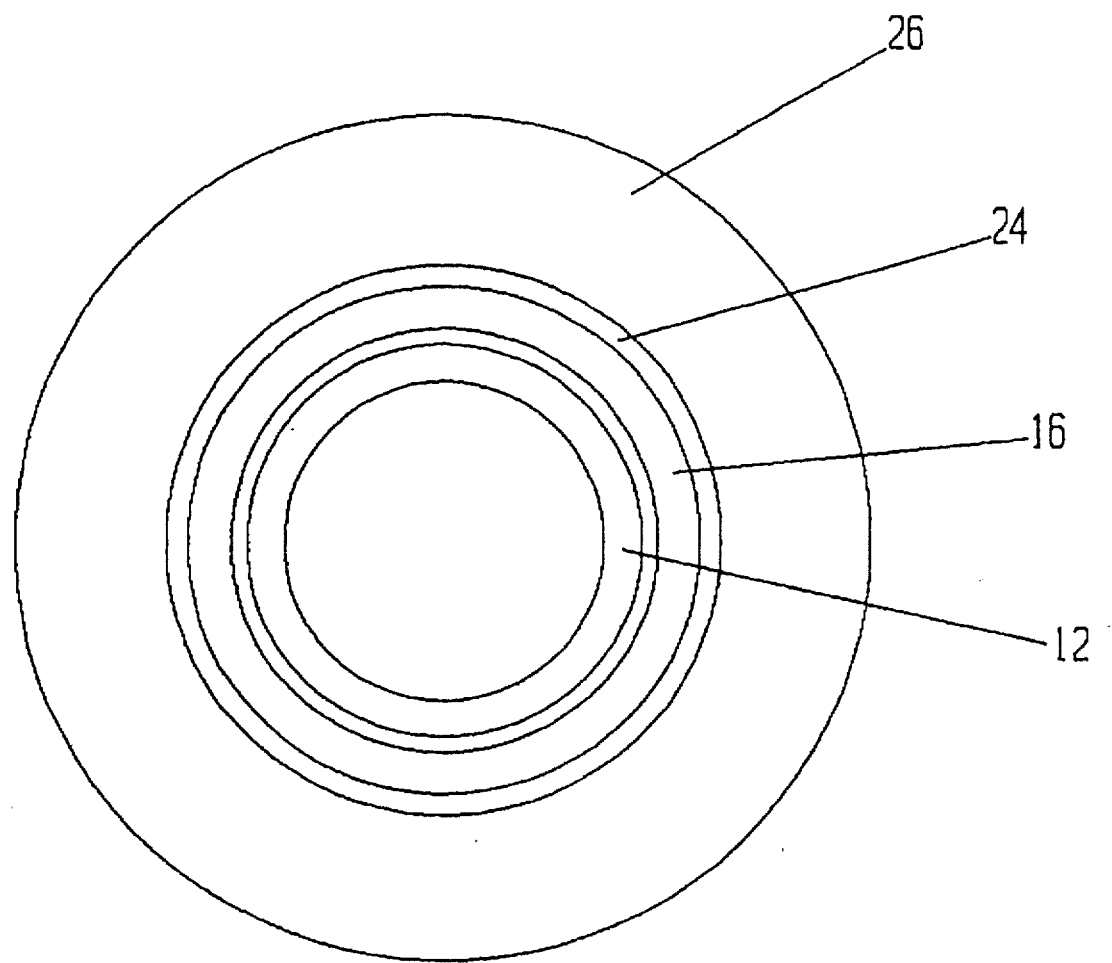
FIG. 1 shows front view of wheel assembly.

In the drawing, a wheel 26 and low friction Fluorocarbon bearings 24 are bonded together as one unit. Retainer 16 which is made to one half the length of the wheel 26, are installed one from each side so that when they bottom out in the center, (distance W/2), the clearance gap between bearing 24 and retainer 16 become a slip fit, thus creating a dynamic surface 30.Tube 12 that is initially cylindrical to permit assembly of the retainer 16, after this assembly both ends of tube 12 is flare or crimped about the perimeter as shown by numerals 14 to hold parts in place. Retainers 16 have a cylindrical interior surface 18 that engages tube 12 and an interior beveled surface 20 that accepts flare 14.

Retainer 16 may be made from steel, hard plastics such as nylon or delrin, or fiber reinforced plastics. Thus, they may be machined, punch formed or molded as desired.

Bearings 24 at any given diameters, and width, at an angle have more circumferential surface area than if it was straight across width W thus resulting in less load force in pounds per square inches of area at the dynamic surface which is designated here as clearance 30. This makes it possible to choose a softer bearing material such as Teflon and other Fluoroplastics which do not have high enough compressive strength to accommodate loads for the wheel to function properly.

Figure 4:
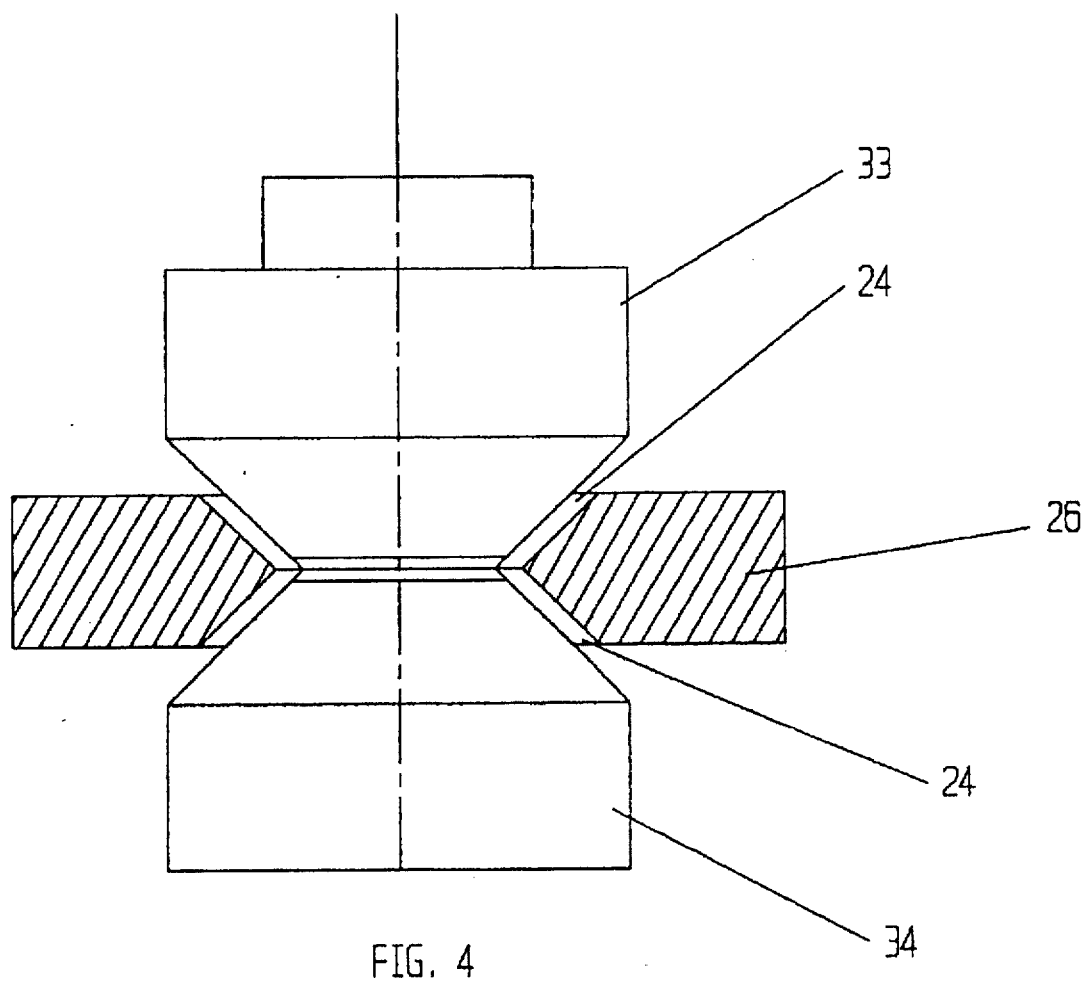
FIG. 4 shows methode of direct pressure bonding arrangement as mentioned in detailed description of the invention.
Figure 5:
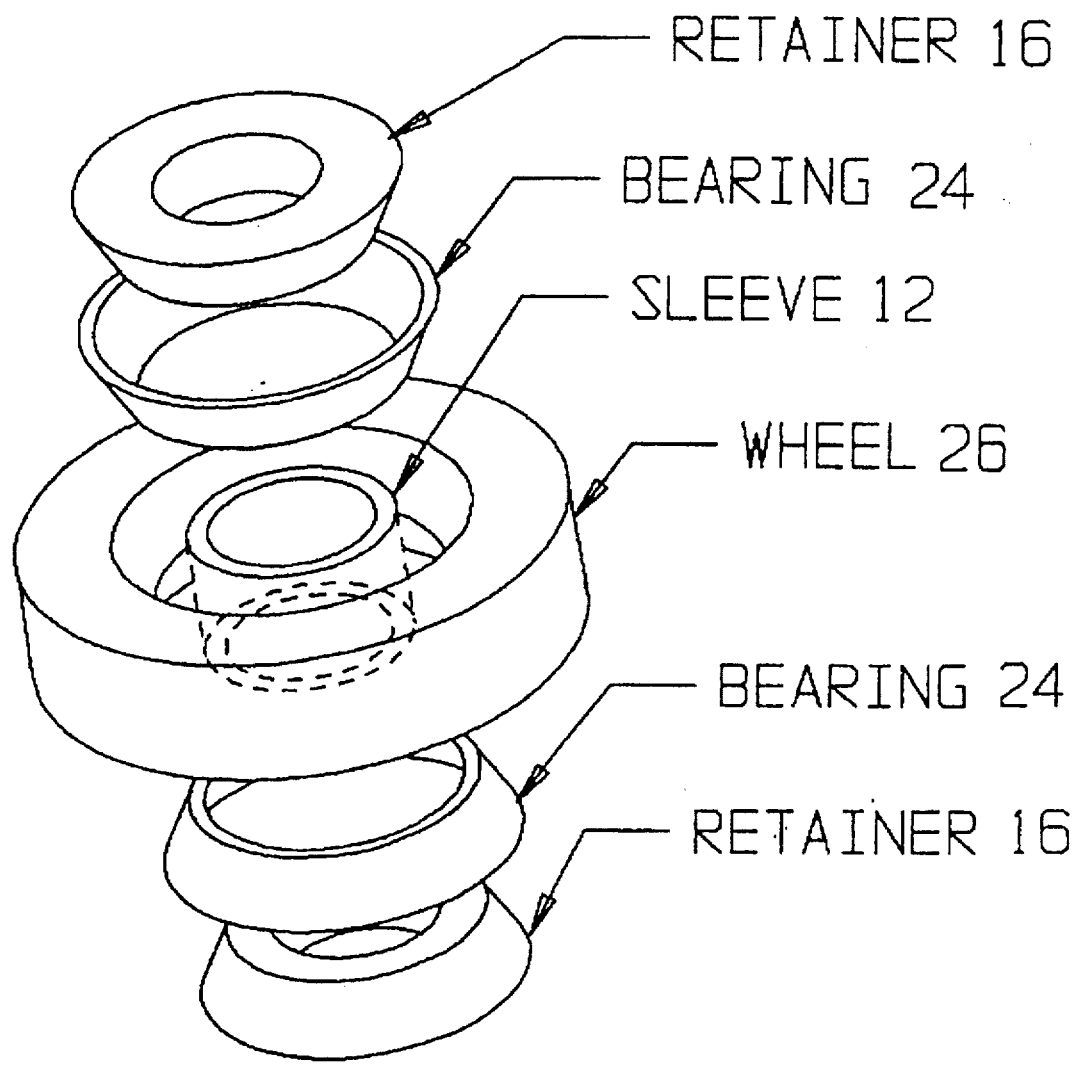
FIG. 5 is an isometric dwg. showing all components.

Wheel 26 may be made from metal, hard rubber, or plastic in the embodiment shown. The "V" shaped configuration keeps the wheel 26 axially located without further retaining washers and devices. This configuration has other advantages, for instance; it makes possible to bond low friction bearing materials like fluoroplastics and teflon with a direct pressure applied to it as it is shown in FIG. 4, where platinum 33 is compressed down to base 34 with bearing 24 in between. Another advantage; If the wheel is eccentrically loaded so that the forces are greater on one side of the wheel, the angled surface on that side allows the wheel to slide toward the other angled side to distribute the load to all the bearing surface. By contrast, a cylindrical bearing simply bears all of the eccentric load on one side and wears or distorts the surface on that side. This centering effect not only spreads out the load, but ensures that the wheel drops precisely tightly into the "V" shaped depression which forces out and excludes any dirt and grime that may enter from the side of the wheel.

Figure 2:
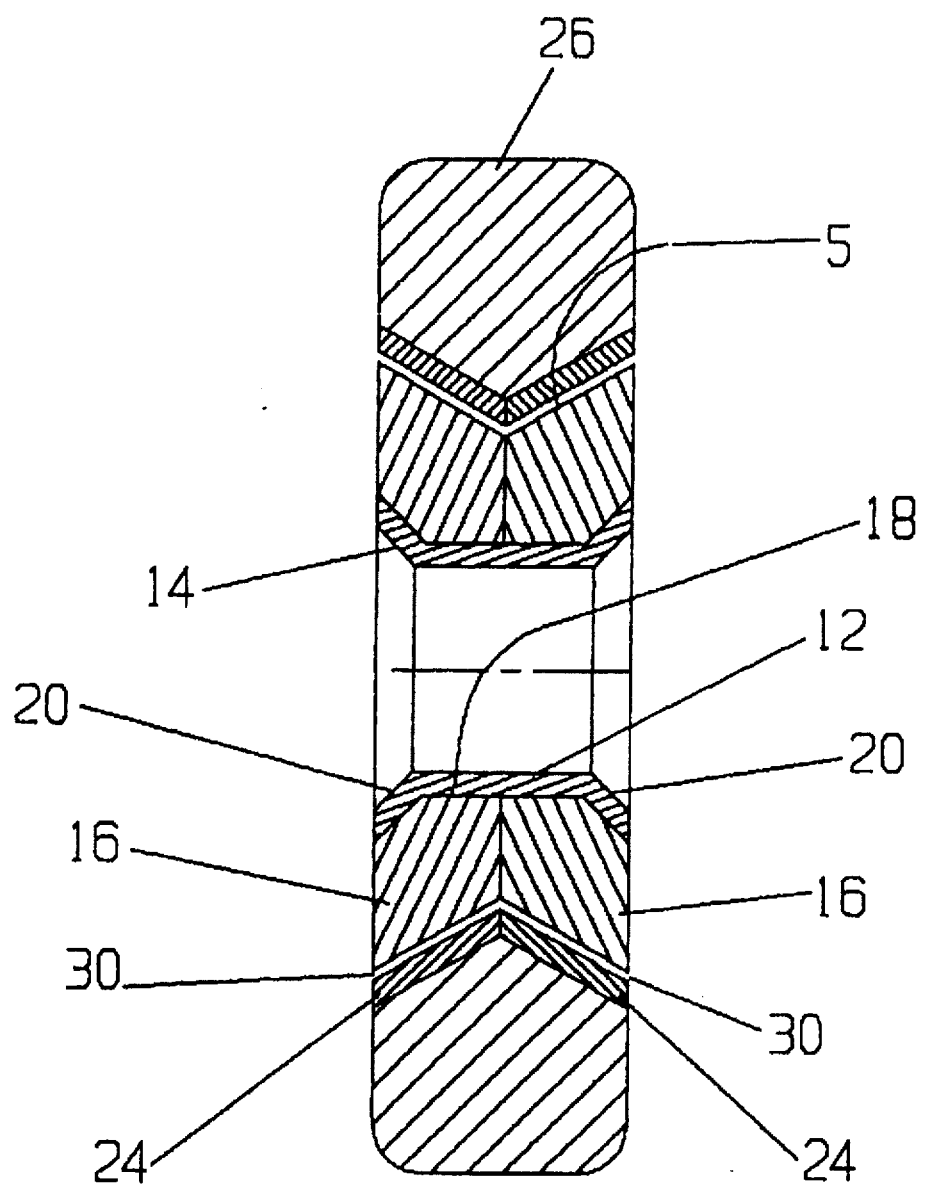
FIG. 2 is a cross-sectional view through the axis of rotation.
Figure 3:
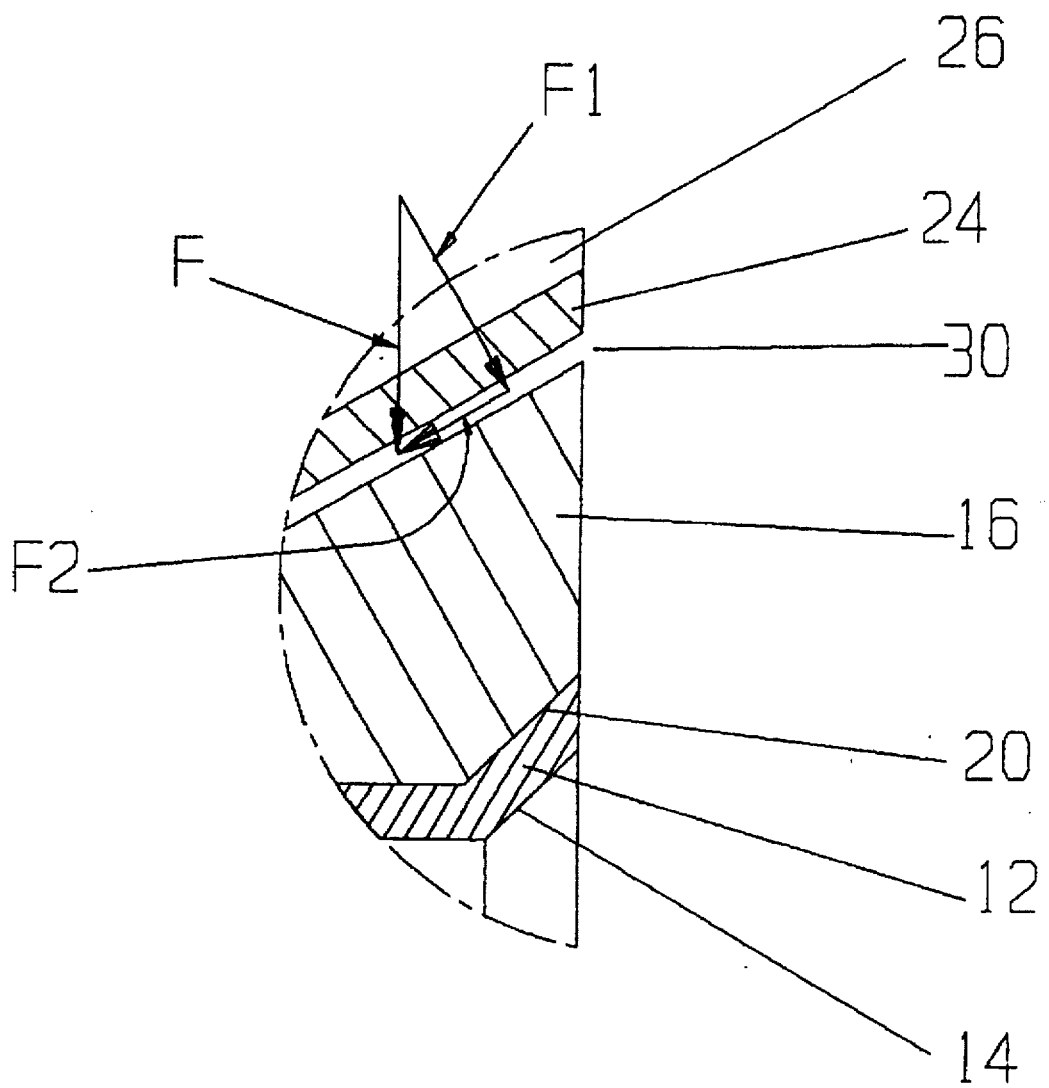
FIG. 3 is an enlarged section designated "A" which contains part of the wheel 26, bearing 24, retainer 16, and sleeve 12.

With any given angle "a", distance "b" is always greater than W/2, where W/2 being ½ width of the wheel, therefore its total circumferential area is also greater than the circumferential area of w/2 length (see FIG. 2) also resultant force F which is applied by load carrying wheel, splits into two forces F1 and F2 where F1 is always less than F and on the other hand force F2 keeps the wheel towards center and only compressive force on bearing 24 at surface area 22 is F1 (FIG. 3) which results in less pound per square inch (psi= F/A) this puts us within compressive strength range of fluorocarbone fluoroplastics materials and therefore makes it possible to utilize these types of bearings.

I claim:

1. A low-friction wheel comprising:
    a tubular hub means adapted to be pressed fit to an axle therethrough, said hub means having an outer surface and two flared ends;
    annular retaining means for retaining a wheel body, said retaining means comprising two annular rings, each of said rings having a cylindrical interior surface and a beveled exterior surface, said interior surfaces of said rings engaging said outer surface of said hub, and said rings being retained together by said flared ends of said hub such that said beveled exterior surfaces defining a V-shaped bearing surface;
    a wheel body having an outer circumferential surface, a V-shaped inner circumferential surface to correspond with said V-shaped bearing surface, said inner circumferential surface encircling said V-shaped bearing surface with a clearance gap therebetween;
    a low friction bearing material being bonded to said V-shaped inner circumferential surface thereby forming a dynamic surface between said V-shaped bearing surface and said V-shaped inner circumferential surface.

* * * * *